US006574844B1

(12) United States Patent
Sinclair (10) Patent No.: US 6,574,844 B1
(45) Date of Patent: *Jun. 10, 2003

(54) TIRE BALANCING AND CHANGING APPARATUS AND METHOD

(76) Inventor: Rick Sinclair, 496 Poplar St., Laguna Beach, CA (US) 92651

( * ) Notice: Subject to any disclaimer, the term of this patent is extended or adjusted under 35 U.S.C. 154(b) by 0 days.

This patent is subject to a terminal disclaimer.

(21) Appl. No.: 10/050,235

(22) Filed: Jan. 15, 2002

(51) Int. Cl.[7] .................. B23P 23/04; B60C 25/132; B60C 25/125; B60C 25/128; E01D 1/00
(52) U.S. Cl. .................. 29/33 R; 157/1.17; 157/1.26; 157/1.28; 14/69.5
(58) Field of Search .................. 29/33 R; 157/1.17, 157/1.26, 1.28; 14/69.5

(56) References Cited

U.S. PATENT DOCUMENTS

| | | | | |
|---|---|---|---|---|
| 5,001,798 A | * | 3/1991 | Hamilton | 14/69.5 |
| 5,257,443 A | * | 11/1993 | Tanimura et al. | 29/33 R |
| 5,513,438 A | * | 5/1996 | Emmons | 33/203.12 |
| 5,980,083 A | * | 11/1999 | Patte et al. | 700/95 |
| 6,247,516 B1 | | 6/2001 | Sinclair | |
| 6,314,602 B1 | * | 11/2001 | Wallen | 14/69.5 |
| 6,401,788 B1 | * | 6/2002 | Sinclair | 157/1.1 |
| 6,413,626 B1 | * | 7/2002 | Wollner | 428/317.3 |

* cited by examiner

Primary Examiner—A. L. Wellington
Assistant Examiner—Dana Ross
(74) Attorney, Agent, or Firm—James G O'Neill (57) ABSTRACT

A tire balancing and changing device (10) has a pair of support surfaces (12, 14) and rotatable drums (42, 44) for contacting a vehicle's tires and wheels (50, 52) to balance and/or change the tires and wheels while on the vehicle (17). The device includes pairs of dowels (32, 34) for mounting and dismounting tires. The drums and pairs of dowels are operated by drive motors (31, 46, 48) that translate the dowels and rotate the tires and wheels. The drums include sensors (49) for balancing tires and wheels. With a vehicle positioned on the support surfaces and the weight of the vehicle removed from the tires by jacks (58, 60), the tires on the vehicle are deflated, removed, replaced and reinflated. The drums are moved into contact with the inflated tires to rotate the tires and wheels to balance them on the vehicle.

24 Claims, 5 Drawing Sheets

TIRE BALANCING AND CHANGING APPARATUS AND METHOD

BACKGROUND OF THE INVENTION

1. Field of the Invention

This invention relates generally to the mounting, dismounting and balancing of tires on a rim, and, more particularly, to an apparatus and method of balancing, mounting, dismounting and cutting of tires from wheels while the wheels remains attached to a vehicle.

2. Description of Related Art

Applicant's U.S. Pat. No. 6,247,516, issued on Jun. 19, 2001, and his pending application, Ser. No. 09/895,626, filed Jun. 29, 2001, describe tire changer and mounting apparatus, that also cut tires on a rim. The disclosure of U.S. Pat. No. 6,247,516 ("'516") and pending application Ser. No. 09/895,626 are incorporated herein, in their entireties, by this reference thereto.

The devices and methods in the '516 patent and in pending application Ser. No. 09/895,626 are drawn to mobile devices that mount or dismount and cut a single tire from or to a wheel while the wheel remains on a vehicle. These devices and methods perform extremely well, and the apparatus and method of the present invention are considered to be patentable extensions thereof.

In particular, the apparatus and method of the present invention are directed to improvements in removing one or more tires at a time from wheels secured to a vehicle and to the accurate balancing of one or more tires mounted on wheels secured on a vehicle.

The present invention also includes improvements in removing tires from wheels secured to a vehicle comprised of modified dowels in which knives for cutting the tires are held. These modified dowels include plastic caps secured to outer ends of the dowels to provide protection when the dowel end contacts a flange of a wheel. The dowels are also capable of being pulled outwardly to extended positions and to self-retract back to normally retracted positions. This movement allows each dowel, when operated correctly, to be pulled outwardly as it comes into contact with the sidewall of a tire which is being turned by a rotating drum. This outward movement helps to bring the dowel into a gentle diametric contact with a rim of a wheel (protected by the plastic cap) where it will be in the best position to work beads of the tire in relation to a flange of the wheel; whether it is breaking the seal of the tires' bead to the wheel flange, or simply displacing the bead of the tire over the flange of the wheel. By having the dowels "automatically" move towards the flange of the rim, a tight fit between the dowel and a wheel flange is accomplished with little effort. This is especially important on the inside wheel flange of a wheel which is often under a vehicle and more difficult to see by an operator, particularly when using a mobile apparatus of the invention.

The ability of the dowels to extend allows one dowel to be pulled outwardly and made to run against one of the wheel flanges while the other remains retracted. With the dowels in this position, the seal of a tires' bead is more easily broken from the opposite wheel flange. This ability of the dowels to move provides the mobile apparatus with increased stability, in particular, during a small percentage of the time when the seal between the tires' bead and the wheel flange is tough to break. In a mobile apparatus it is possible that the apparatus (because of its weight) might slide under the tire and wheel when a nonretracting dowel is operated in a manner to try and break the seal of a tires' bead to a wheel. By allowing the dowels to move, and placing an opposite dowel against the flange of the wheel, the apparatus will be prevented from slipping under the tire as it tries to break a difficult tire bead's seal. The plastic caps protect the wheel during this operation.

Additionally, it is well known to attempt to balance a tire while it remains on a vehicle or wheel. Traditionally, a vehicles' engine is used to drive the axle of a vehicle, or a "spinner" (an independent machine capable of spinning the vehicles' tire and wheel) is connected to a non-drive train axle and used to rotate the tire and wheel to a sufficient speed in order to electronically sense, or "pickup," any vibration created by any imbalance in the tire wheel as they are spinning on the vehicle. The known electronic sensing device used to "pickup" such vibration is attached to a portion of the under side of the car that supports the tire and wheel assembly. The laws of gravity dictate that the point of imbalance of a tire and wheel is located along the circumference of the tire where the greatest degree of vibration is generated. This occurs when the heavy side of the circumference has rotationally descended to its lowest point and begun to move rotationally upward. In order to balance a tire in this manner, there are two pieces of information needed: 1. the amount of weight needed to offset the heavy side of the circumference of the tire, and 2. at what point along the circumference this offsetting weight should be placed. Calculations are performed to determine the amount of weight associated with any given amount of vibration detected through the electronic sensing device mentioned above. In order to mark the location along the circumference of the tire for the needed counterweight, a strobe light is used and aimed at the tire and wheel assembly by an operator. When the heavy portion of the circumference reaches the bottom of its arc (hereafter referred to as six o'clock for simplicity) the strobe light flashes on the tire. The desired position for placement of a weight on the tire and wheel is then marked by an operator using chalk, tape, or the like. The operator then places the amount of weight determined by the sensing device at the six o'clock position marked by the operator using the strobe light to bring the tire and wheel into balance.

This method of balance has both good and bad attributes: one good attribute is that it rotates and senses the imbalance of all moving parts (tire, wheel, rotor, drum, axle, wheel cover and wheel lug nuts, as well as the connection of the wheel to the axle—which can be non-concentric). This is more than an off-the-car balancer or balancing machine is capable of accomplishing. A bad attribute to this method of balancing is that it is only capable of detecting imbalance in one vertical plane.

However, the most common form of balancing a tire and wheel is what is referred to as "off-the-car" balancing. A balancing machine, called a balancer, typically made up of a spindle and hub is used. A tire and wheel assembly is first removed from a vehicle and quickly mounted on this machine. The spindle of the balancer is connected to a motor that is capable of spinning the tire and wheel assembly. The spindle is also connected to sensitive electronic motion devices that can electronically "pickup" the imbalance of the tire and wheel assembly when it is spinning. Because the tire and wheel assembly is affixed to the spindle, and, therefore, the electronic sensing devices, the balancing machine will be able to tell the operator where and how much counterweight to place along the circumference of the tire by electronically informing the operator where the six o'clock position is in relation to the tires' imbalance. Furthermore, by initially programming the balancer with information about the wheel and tire (width, offset, diameter) the balancing machine can make more detailed calculations and split the required weights between two planes (inner and outer rim flanges) and take into account horizontal as well as vertical imbalance. These calculations are standard mathematical equations and are feasible and applicable to the process of balancing a tire and wheel using an "off-the-car" balancer, since the tire and wheel assembly is connected to a rotating spindle that is itself connected to the sensing devices to provide the necessary information.

The method of balancing a tire and wheel with the described "off-the-car" balancer allows for more information and control of that information than the "on-the-car" balancing technique because the sensing devices are connected to the revolving tire and wheel by way of the spindle. The obvious disadvantage is that the "off-the-car" balancer only balances the tire and wheel assembly. The present invention overcomes the known problems with balancing machines and methods, and combines the best features of these known machines and methods for balancing tires in a unique and novel manner.

There still exists a need in the art for an apparatus and method that more efficiently allows tires to be dismounted from or mounted to wheels without taking the wheels off the vehicle. And, there also exists a need in the art for an apparatus and method that easily balances tires on wheels, held on a vehicle.

SUMMARY OF THE INVENTION

Accordingly, it is a general object of the present invention to provide an improved tire balancing and changing apparatus. It is a particular object of the present invention to provide an improved tire balancing and changing apparatus and an improved method for using the same. It is another particular object of the present invention to provide an improved tire balancing and changing apparatus that more easily allows the changing of a plurality of tires from wheels while the wheels are still attached to a vehicle. It is a further particular object of the present invention to provide an improved tire balancing and changing apparatus and method that includes a plurality of drums for spinning the tires and wheels of a vehicle, while the wheels are still attached to the vehicle. It is yet a still further particular object of the present invention to provide an improved tire balancing and changing apparatus and method of use that allows match mounting of tires to wheels on a vehicle. It is a still further particular object of the present invention to provide a tire balancing and changing apparatus secured in a bay within a building, or the like. And, it is yet another particular object of the present invention to provide an improved balancing and changing apparatus having rotatable drums and means for extending dowels for more easily removing tires from wheels mounted on a vehicle.

These and other objects of the present invention are achieved by providing a tire balancing and changing device having a plurality of drums for movement into contact with a vehicle's tire and wheel assemblies to enable the tires of the vehicle to be balanced and/or changed while the wheels remain on the vehicle. The tire balancing and changing device of the present invention includes a plurality of pairs of dowels to mount and dismount tires, driving means to operate the dowels and to rotate tire and wheel assemblies, and sensing means to enable the tires to be balanced on the wheels on the vehicle.

The novel method of the present invention includes the steps of positioning a vehicle on a body in the device; taking the weight of the vehicle off the tires and wheels; removing and replacing at least some of the tires on the vehicle as required; and moving drums into contact with properly inflated tires on wheel assemblies and rotating the drums to rotate the tire and wheel assemblies to balance the tires and wheels on the vehicle.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE PREFERRED EMBODIMENT

The following description is provided to enable any person skilled in the art to make and use the invention, and sets forth the best modes contemplated by the inventor of carrying out his invention. Various modifications, however, will remain readily apparent to those skilled in the art, since the generic principles of the present invention have been defined herein, specifically to provide for an improved and simplified tire balancing and changing device and method of balancing, mounting or dismounting tires on or from vehicle rims or wheels, while the wheels remain secured on a vehicle.

The present invention allows tires to be mounted and dismounted in a manner similar to that disclosed in the '516 patent and/or the Ser. No. 09/895,626 application. However, the device of the present invention allows a plurality of tires to be mounted and dismounted, preferably in a fixed or built-in type-machine or bay located at a store or similar type location. This in-store or fixed version can use the same type components disclosed in the '516 patent or the Ser. No. 09/895,626 application to bring the tires and wheels into contact with a rotatable drum so as to mount or dismount tires. The machine may also include improved extendable dowels having plastic tips and movable portions, as described more fully below.

Additionally, the present invention allows the tire and wheel assemblies to remain attached to the vehicle while being balanced. One unique feature is that a power drum that spins the tire and wheel is also the "spindle" that stays connected to the tire at all times. Therefore, this spindle contains sensors that read the imbalance of the tire and wheel with all of the capabilities of the traditional "off-the-car" balancer. The power drum preferably has a rubber surface to rotate the tire and wheel assemblies and is fitted with one or more electronic devices or sensors to receive the same electronic signals as an "off-the-car" balancer. The type of electronic device or devices used can vary. The powered rubber drum is held in steady contact with the outside diameter of the tire and is, therefore, more sensitive and able to "pickup" or sense finer imbalances than that of the spindle of an "off-the-car" balancer. The spindle of an "off-the-car" balancer is stabilized as it passes through the necessary ball bearings needed to keep it, the balancer's motor, and the tire and wheel assembly rotating smoothly. The electronic sensing devices mounted on or in the drums, or adjacent thereto, pick up the tire and wheel assembly imbalance through these stabilizing factors. The present invention separates the axis of the revolving tire and wheel from the revolving rubber drum that is electronically picking up the tire and wheel imbalance. Because the tire and wheel are being rotated on their axle, they are free to move and shake because of any imbalance in the tire and wheel, and it is easier for the sensing devices in the rubber drum to more accurately pickup such imbalance. Furthermore, because the powered drum never loses contact with the tire (unlike the traditional spinning device of an "on-the-car" balancer) the devices therein can electronically tell an operator where to place any required weights along the circumference of the tire and wheel assembly in order to attain balance. For example, a rubber drum is brought into contact with a tire, or a tire is brought into contact with a rubber drum for balancing. A button is pushed to electronically set the rubber drum to "zero." The tire and wheel assembly is then rotated 360 degrees and the button is pushed again. This informs the rubber drum how many of its' rotations equates to one tire revolution. This is equivalent to an "off-the-car" balancer using one revolution of its own spindle to know where the tire is in its rotation and, therefore, enables the operator to accurately place any required weights.

The present invention has all of the electronic capabilities of a traditional "off-the-car" balancer, combined with the physical attributes of an "on-the-car" balancer since it spins the tire, wheel, rotor, drum, axle, wheel cover, lug nuts, etc. on the vehicle.

The present invention also allows match mounting of tires and wheels. That is, as cars become more road-sensitive and the ride of the vehicle is smoother, the ability to perform an excellent balancing of tires is becoming an ever-increasing concern. Vehicle manufacturers perform what is called "match-mounting" of tires to wheels at the factory. A wheel is put on a balancer and spun to register its imbalance. The wheel is then mounted to the tire and the tire and wheel assembly are spun on the balancer. The balancer computes the imbalance of the wheel (spun previously) to the imbalance of the tire and wheel assembly. It then advises an operator to rotate the tire a certain number of degrees relative to the wheel. This requires that air be let out of the tire and the seal between the tire and wheel to be broken. The tire is then turned the required amount on the wheel and reinflated. Comparing the imbalances of the wheel and tire against each other in order to make them more "balanced" as a pair greatly improves the tire and wheel assembly's balance and, therefore its ride. A small amount of weight might still be required to be placed on the wheel, however, the overall circumference is more balanced—as compared to a larger amount of weight at one particular point on the circumference in an attempt to balance the overall tire and wheel.

Match mounting is time consuming due to the multiple steps that have to be performed. Most tire retailers do not want to take the time to accomplish this procedure. The present invention enables match mounting to be done in fewer steps because the mounting and balancing of tires is accomplished by the same machine and with the wheels remaining on the car. The process of spinning the wheels to register any imbalance is simply done after an old, or to be repaired tire, is removed and before a new or repaired tire is installed. Once a tire is installed and the balance is performed on the tire and wheel assembly, the required match mounting rotation of the tire in relation to the wheel can be done by deflating and breaking the tires' seal to the rim and turning the tire with respect to the wheel. Though this is a longer process than a normal balancing procedure, it is still much easier than trying to perform the match mounting process with typical tire machinery, which requires shifting the wheel and tire assembly back and forth from balancer to changer several times for one tire.

Turning now to the drawings, a currently preferred embodiment of the invention is shown in FIGS. 1–5. A device in the form of a fixed bay, or the like 10 has a body comprised of a pair of elongated ramps or surfaces 12, 14, on or above a floor. The ramps or surfaces 12, 14 may include support feet or legs 11 and movable drive-on sections 13, 15, or may be lowered, as explained more fully below. In any event, the ramps or surfaces 12, 14 are sized and dimensioned to enable a vehicle 17 to be easily driven onto the same (see FIGS. 2 and 3). Additionally, the ramps or surfaces 12, 14 are long enough and spaced apart a sufficient distance to allow various size vehicles to be driven thereon, and include depressions or stops 18, 20 thereon to allow a driver to determine where a vehicle's front wheels should be placed or stopped. Outer ends 22, 24, 26, 28 of the ramps 12, 14 include a plurality of opposed or spaced apart pairs or sets of dowels 30, 32 connected to drive means 31. Or, the dowels 30, 32 may be placed on trays or other supporting means between ramps or surfaces 12, 14. The pairs of dowels 30, 32 are preferably rotatable and mounted so as to be movable with respect to the ramps or surfaces 12, 14. For example, as shown in FIGS. 2–5, each pair of dowels 30, 32 may be moved perpendicular to or along an axis of the ramps or surfaces 12, 14 and moved, as by being raised or rotated with respect to the ramps or surfaces by the drive means 31. The pairs of dowels 30, 32 are moved to contact tires 50 of a vehicle, or the vehicle may be moved so that the tires contact the pairs of dowels. Each of the dowel includes a body 34, 36 that may be extended or moved with respect to holding portions 38, 40 thereof (see FIGS. 4 and 6–8) and have plastic caps 41 on their outer ends.

The ramps or surfaces 12, 14 also include pairs of drums 42, 44 connected to drive motors 46, 48 and sensors 49. The drums are preferably rubber coated and the tires 50 and wheels 52 are brought into contact with the drums, or the drums are brought into contact with the tires 50 and wheels 52, to rotate the tire and wheel assemblies. The pairs of drums 42, 44 are operated by means, such as levers 53, 54, to elevate the drums from openings 56, 58 formed in the ramps 12, 14. Or, the drums may be moved in any other available manner. The drums and/or levers may be moved or slid with respect to the ramps or surfaces 12, 14, for example, along slots 60, in order to be aligned with the tires 50 so that the drums 42, 44 may be raised to contact the tires and wheels, as needed.

The body of device 10 may include holding or supporting devices 62. 64, such as a plurality of jacks to hold the vehicle in position if the surfaces 12, 14 are lowered, or elevating systems for elevating the vehicle 17 above the ramps. One or more hydraulic systems may be used to move the surfaces 12, 14 or operate the elevating systems 62, 64, in a manner well known to those skilled in the art.

Figure 1:
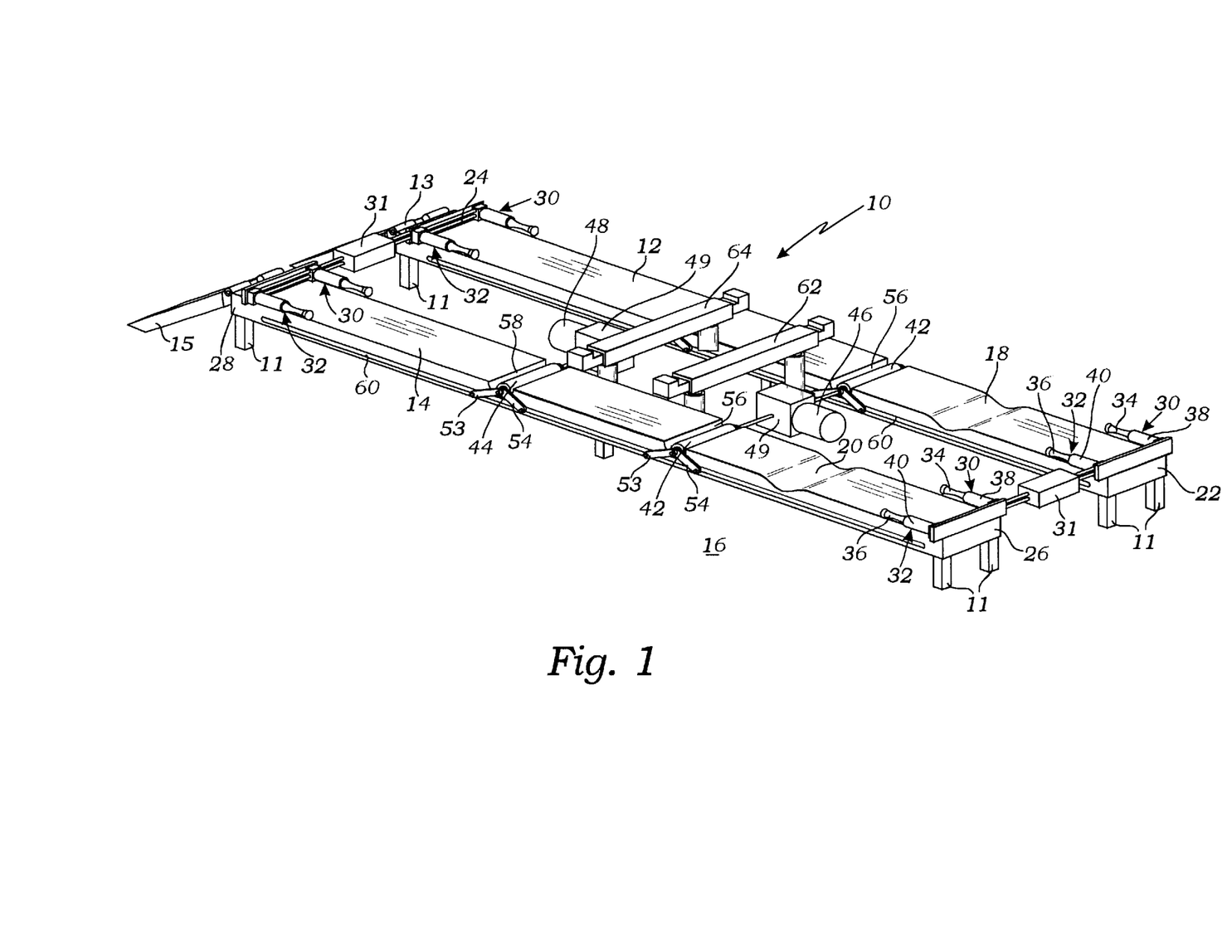
FIG. 1 is a schematic perspective view of a preferred embodiment of a fixed device of the present invention.
Figure 2:
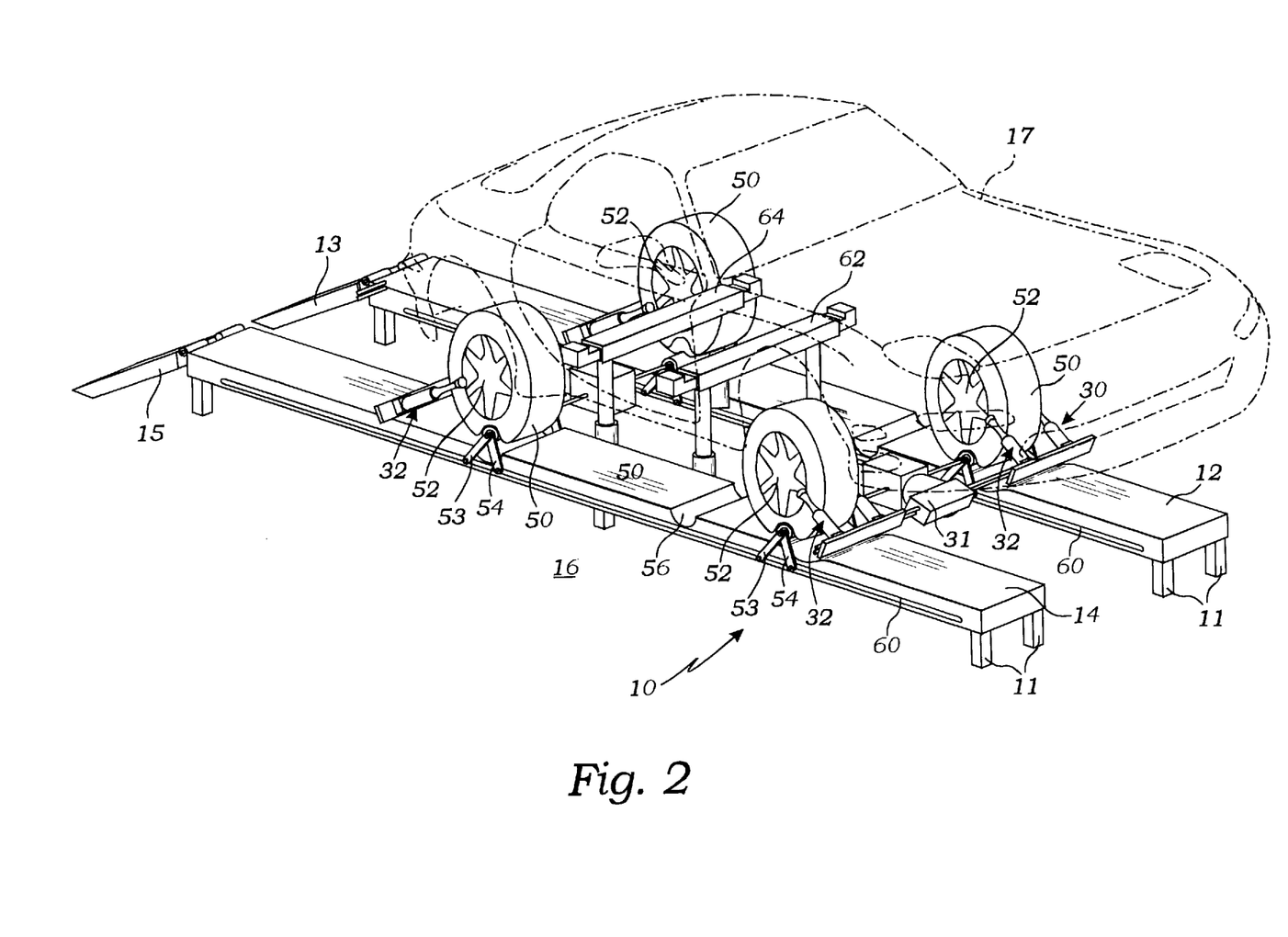
FIG. 2 is a schematic perspective view of the fixed device of the present invention with a vehicle in a raised position thereon showing how tires may be changed with the wheels remaining on the vehicle.

The operation of the device 10 of the present invention will now be described. As shown in FIG. 2, a vehicle 17 is driven or otherwise moved up the end ramps 13, 15, onto the ramps or surfaces 12, 14, until it is in the required position, for example with its front tires in the depressions 18, 20. The surfaces 12, 14 are then lowered with the jack stands 62, 64 supporting the vehicle 17 with its four tires 50 and wheels 52 above the surfaces, or the vehicle is elevated or raised above the ramps by the jacks to elevate the vehicle and its four tires and wheels above the ramps. The four pairs of dowels 32, 34 are then moved into position adjacent to or under the four tire and wheel assemblies by their respective drive means 31, or other similar means. Then, depending on which tires are going to be changed or worked on, all or some of the pairs of dowels 32, 34 are brought into contact with the tires 50, for example, the positions shown in FIG. 2 by drive means 31. Any tires to be removed are then moved into contact with the respective drum so that the tires to be removed may be rotated by the drums. The tires to be removed are deflated at any convenient time. The pairs of dowels 32, 34 are operated by the drive means 31 to either first cut off portions of the deflated tires using knives 63 (see FIG. 5) and/or break the seals of the tire beads, by being moved in any desired pattern across the wheel rims, for example, consecutively, or together in tandem, to remove the entire tire or the portion remaining after the outer portion has been cut off (see FIGS. 4 and 6–9). If the tire seals are difficult to break, the body 34, 36 of one of the dowels 32, 34 may be extended and the plastic coated end cap or portion thereof 41, placed against a rim wheel 52, while the second dowel is traversed across the wheel rim to break a first bead of the tire, during rotation of the tire. The second dowel may then be extended, if needed, and the first dowel moved across the wheel rim (see FIGS. 6–9).

Figure 3:
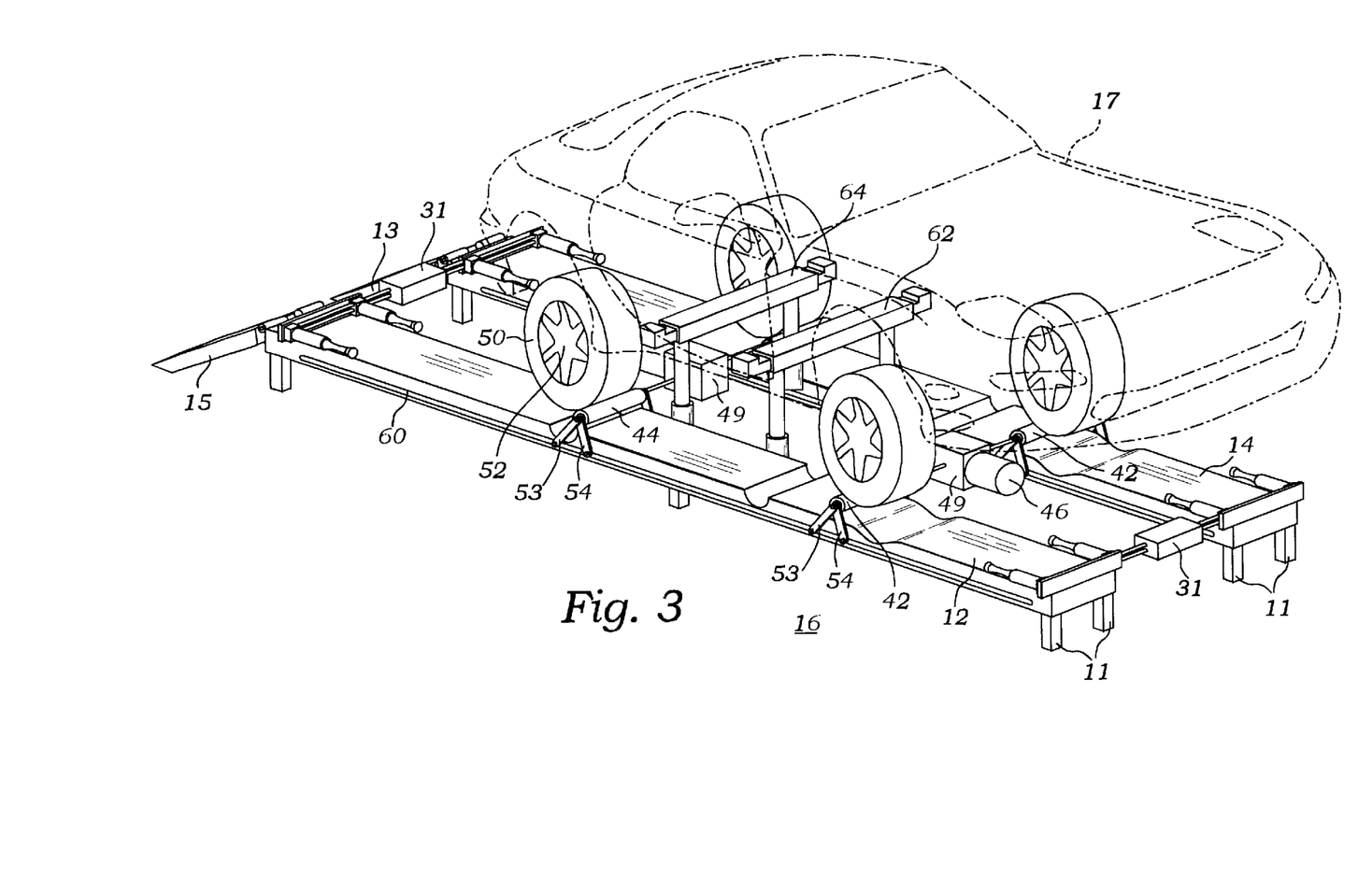
FIG. 3 is a further schematic perspective view, similar to FIG. 2 of the fixed device of the present invention with a vehicle in a raised position thereon showing how the tires and wheels may be balanced.
Figure 4:
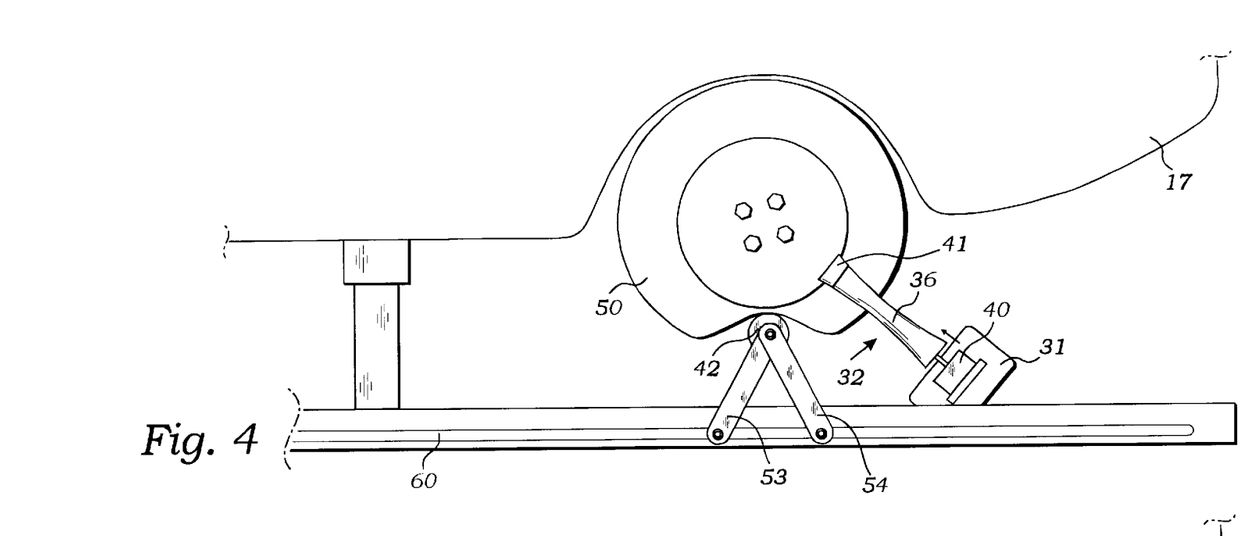
FIG. 4 is an enlarged side elevational view of one of the tire and wheel assemblies of the vehicle of FIG. 2 shown in position where the tire may be changed.
Figure 5:
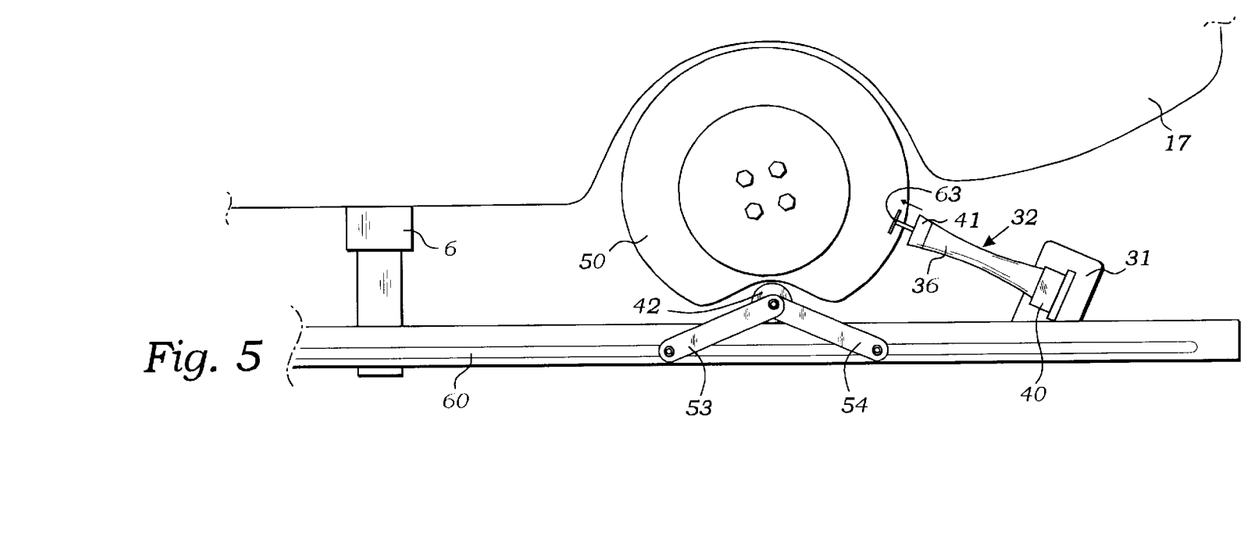
FIG. 5 is an enlarged side elevational view of one of the tire and wheel assemblies of the vehicle of FIG. 2 shown in position where the tire may be cut.
Figure 6:
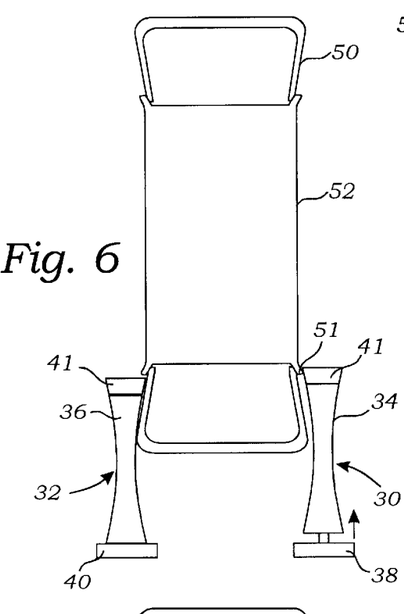
FIGS. 6–9 are schematic representations of the retractable dowels of the present invention shown in various positions to remove a tire from a wheel.
Figure 7:
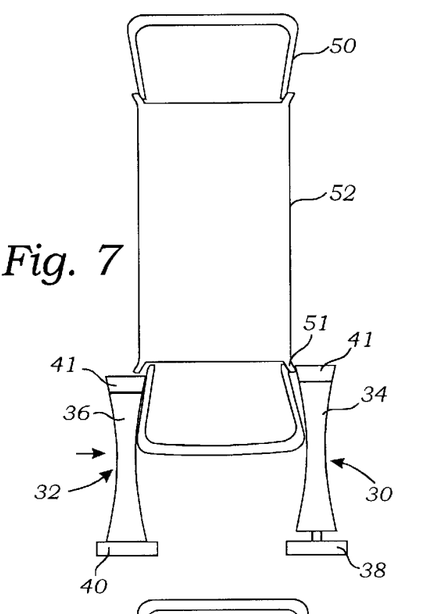
Figure 8:
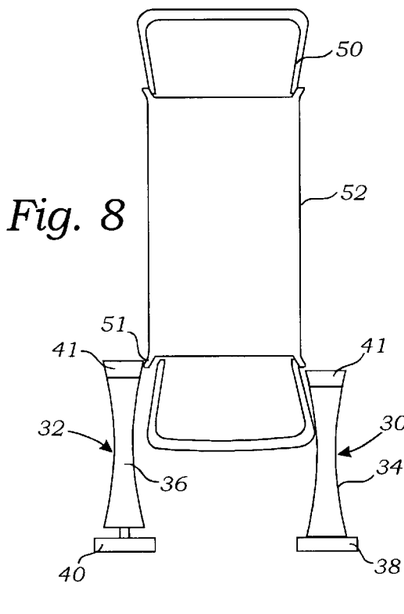
Figure 9:
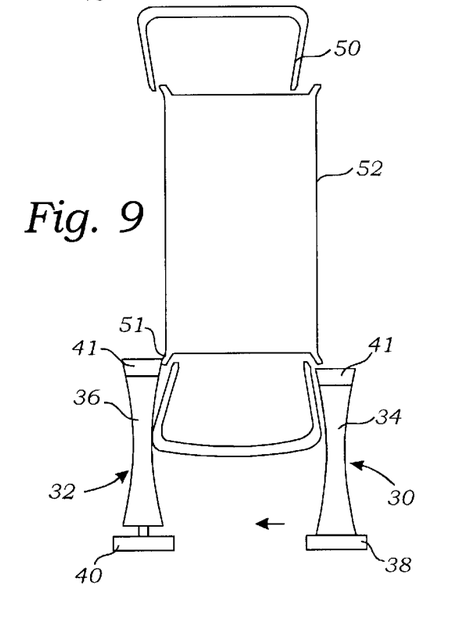

After any new or removed tires have been replaced on the wheels and reinflated, as described in the '516 patent, or as described in pending application Ser. No. 09/895,626 by use of the dowels 32, 34 and drums 42, 44, some or all of the tires and wheels may be balanced. This balancing may be accomplished as shown in FIG. 3. The inflated tires 50 are brought into contact with the drums 42, 44, or the drums are brought into contact with the inflated tires. The drums are then rotated by the drive motors 46 to rotate the tire and wheel assemblies at the desired speeds. The electronic sensing means 49 in or adjacent the drums 42, 44 will sense any imbalances and allow an operator to place any required weights on the wheels 52. Or, the tires and wheels may be match balanced, as explained above, namely, by stopping the drums 42, 44, deflating the tires 50, breaking the beads, but not removing the tires, rotating the tires with respect to the wheels and reinflating the tires.

FIGS. 6–9, show schematic representations of how the extendable portions 34 or 35 dowels may be used so that its plastic coated end cap 41 is pressed against a wheel rim 51, while the other, non-extended, dowel is moved across the wheel rim to break a tire bead when removing a tire.

Those skilled in the art will appreciate that there are adaptations and modifications of the just-described preferred embodiments that can be configured without departing from the scope and spirit of the invention. Therefore, it is to be understood, that within the scope of the intended claims, the invention may be practiced other than is specifically described herein.

What is claimed is:

1. A tire balancing, dismounting and mounting apparatus, comprising:
    a body having a plurality of means for rotating tires mounted on wheels on a vehicle;
    means for operating the plurality of means for rotating tires mounted on wheels mounted on a vehicle;
    a plurality of means for breaking tire beads of tires mounted on wheels mounted on a vehicle held in the body; and
    means for operating the plurality of means for breaking tire beads of the tires mounted on wheels mounted on a vehicle.

2. The tire balancing, dismounting and mounting apparatus of claim 1 wherein the plurality of means for rotating tires mounted on wheels mounted on a vehicle are drums rotatably held in the body.

3. The tire balancing, dismounting and mounting apparatus of claim 2 wherein the plurality of means for breaking tire beads of the tires mounted on wheels mounted on a vehicle include a plurality of pairs of dowels.

4. The tire balancing, dismounting and mounting apparatus of claim 3, further including means for removing a vehicle's weight from tires and wheels held on the vehicle.

5. The tire balancing, dismounting and mounting apparatus of claim 4 wherein the drums have a non-slip rubber coating and are driven in pairs by motor means.

6. The tire balancing, dismounting and mounting apparatus of claim 5 wherein the plurality of pairs of dowels are movable with respect to the body and the plurality of drums.

7. The tire balancing, dismounting and mounting apparatus of claim 6 wherein the plurality of pairs of dowels have plastic outer ends capable of contacting a wheel without marring such wheel.

8. The tire balancing, dismounting and mounting apparatus of claim 7 wherein the body is secured in a building and includes means for moving the plurality of drums into contact with tires mounted on wheels on a vehicle.

9. The tire balancing, dismounting and mounting apparatus of claim 1 wherein the plurality of means for rotating tires mounted on wheels are rubber coated drums rotatably held in the body.

10. The tire balancing, dismounting and mounting apparatus of claim 9 wherein the plurality of means for breaking tire beads of the tires mounted on wheels mounted on a vehicle are opposed pairs of movable dowels.

11. The tire balancing, dismounting and mounting apparatus of claim 10 wherein the opposed pairs of movable dowels are movable along an axis of the body and may be raised and lowered into contact with tires mounted on wheels mounted on a vehicle.

12. The tire balancing, dismounting and mounting apparatus of claim 11 wherein the body includes a plurality of means for elevating a vehicle above the body and the pairs of movable dowels are translatable across the face of the tire, and include plastic outer ends for selectively contacting the wheels.

13. The tire balancing, dismounting and mounting apparatus of claim 12, further including means for elevating the plurality of drums to contact and rotate a vehicle's tires when a vehicle is elevated above the body.

14. The tire balancing, dismounting and mounting apparatus of claim 13, further including means for rotating the drums in pairs to at least rotate a pair of tires mounted on wheels on a vehicle contacted by the rotating drums.

15. A tire balancing, dismounting and mounting apparatus, comprising:

a body having a pair of ramps with a plurality of drums for rotating tires mounted on wheels on a vehicle held in the body;

drive means for operating the plurality of drums for rotating tires mounted on wheels mounted on a vehicle;

at least one jack system for supporting a vehicle above a surface;

a plurality of pairs of movable dowels for breaking tire beads of tires mounted on wheels mounted on a vehicle held in the body; and further drive means for operating the plurality of pairs of movable dowels.

16. The tire balancing, dismounting and mounting apparatus of claim 15 wherein the plurality of pairs of movable dowels are movable with respect to the body and include means for bringing them into contact with tires mounted on wheels mounted on a vehicle.

17. The tire balancing, dismounting and mounting apparatus of claim 16 wherein the plurality of pairs of movable dowels are translatable across a wheel, and include plastic outer ends for selectively contacting a rim of a wheel.

18. The tire balancing, dismounting and mounting apparatus of claim 17, further including means for elevating the plurality of drums to contact and then rotate tires mounted on wheels when a vehicle is elevated above the body.

19. The tire balancing, dismounting and mounting apparatus of claim 18, further including means for rotating the drums in pairs to at least rotate a pair of tires mounted on wheels on a vehicle contacted by the rotating drums.

20. A tire balancing, dismounting and mounting apparatus, comprising:

a body having a pair of elongated ramps;

a plurality of rubber coated drums mounted in the pair of ramps;

a plurality of drive motors to elevate and rotate the plurality of rubber coated drums;

a plurality of jack systems for elevating a vehicle above the body;

a plurality of pairs of opposed movable dowels for breaking tire beads of tires mounted on wheels mounted on a vehicle held in the body; and a plurality of drive means for sliding the plurality of pairs of opposed movable dowels along an axis of the ramps and to raise the plurality of pairs of opposed movable dowels with respect to the ramps.

21. A method of balancing tires on wheels mounted on a vehicle, comprising the steps of:

driving a vehicle onto a body having a pair of supporting surfaces;

operating means for removing the vehicle's weight from tires and wheels mounted on the vehicle;

moving the tires and wheels into contact with a plurality of drums;

rotating the tires and wheels by the plurality of drums; and placing weights, as needed, on the wheels.

22. The method of claim 21 including the further steps of deflating the tires, moving a plurality of pairs of opposed movable dowels into position to break the beads of the tires with the wheels, rotating the tires with respect to wheels, and reinflating the tires on the wheels.

23. A method of dismounting or mounting tires from wheels mounted on a vehicle, comprising the steps of:

driving a vehicle onto a body having a pair of support surfaces;

operating means to remove the vehicle's weight from tires and wheels mounted on the vehicle;

moving a plurality of pairs of opposed movable dowels into position against sidewalls of the tires;

deflating at least some of the tires;

moving the deflated tires into contact with a plurality of drums;

rotating the deflated tires and wheels contacted by the plurality of drums; and breaking bead seals between the rotating deflated tires and wheels by moving the pairs of opposed movable dowels across rims of the wheels to remove the deflated tires from the wheels.

24. The method of claim 23 including the further steps of bringing new tires into contact the wheels, alternately moving the pairs of opposed movable dowels into contact with opposite sidewalls of the new tires and across the rims of the wheels to mount the new tires on the wheels, and reinflating the new tires.

* * * * *